(12) United States Patent
Maeno

(10) Patent No.: US 6,314,407 B1
(45) Date of Patent: Nov. 6, 2001

(54) POS TERMINAL UNIT PROVIDED WITH CUSTOMER APPROACH NOTIFICATION FUNCTION

(75) Inventor: Masahiro Maeno, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/480,116

(22) Filed: Jan. 10, 2000

(30) Foreign Application Priority Data

Jan. 14, 1999 (JP) .................................................. 11-008471

(51) Int. Cl.$^7$ ....................................................... G06F 19/00
(52) U.S. Cl. .......................................... 705/16; 340/286.06
(58) Field of Search .......................... 705/16; 340/286.06, 340/286.07, 286.08, 286.09, 286.11, 286.12

(56) References Cited

U.S. PATENT DOCUMENTS

| | | | |
|---|---|---|---|
| 3,893,094 | * 7/1975 | Thorson et al. | 340/258 B |
| 3,921,160 | * 11/1975 | Ratner | 340/286 |
| 4,398,257 | * 8/1983 | Paganini et al. | 364/550 |
| 5,408,210 | * 4/1995 | Oka | 340/286.06 |
| 5,475,369 | * 12/1995 | Baker | 340/573 |
| 5,572,202 | * 11/1996 | Regel et al. | 340/917 |
| 5,603,054 | * 2/1997 | Theimer et al. | 395/826 |
| 5,656,995 | * 8/1997 | Peters | 340/541 |
| 5,828,294 | * 10/1998 | Shank | 340/326 |
| 5,831,534 | * 11/1998 | Mooney et al. | 340/573 |
| 5,963,137 | * 10/1999 | Waters | 340/573.4 |
| 5,974,393 | * 10/1999 | McCullough et al. | 705/8 |
| 6,069,655 | * 5/2000 | Seeley et al. | 348/154 |
| 6,111,504 | * 8/2000 | Packard et al. | 340/568.1 |
| 6,154,133 | * 11/2000 | Ross et al. | 340/541 |

FOREIGN PATENT DOCUMENTS

| | | | |
|---|---|---|---|
| 0740276 | * 10/1996 | (EP) | 710/19 |
| 61-54592 | 3/1986 | (JP) . | |
| 3-25596 | 2/1991 | (JP) . | |
| 3-225498 | 10/1991 | (JP) . | |
| 6-231330 | 8/1994 | (JP) . | |
| 6-251260 | 9/1994 | (JP) . | |

OTHER PUBLICATIONS

"Technology for Pyroelectric Sensors Detects Human Motion", Aug. 1, 1995, Journal of Electronic Engineering, p. 19 (abstract only).*

* cited by examiner

Primary Examiner—Robert P. Olszewski
Assistant Examiner—Michael Cuff
(74) Attorney, Agent, or Firm—Sughrue, Mion, Zinn, Macpeak & Seas, PLLC

(57) ABSTRACT

A POS terminal unit is provided which automatically notifies an operator about the presence of a customer waiting to make a purchase when a salesclerk is absent from the POS terminal unit. When an approach sensor 1 detects the approach of a customer to the POS terminal unit, a signal is transmitted to a control portion through a first detecting portion 3 and a buzzer is activated. An ID card identification sensor 2 is a non-contact type sensor capable of receiving data of an ID card 8 located within a predetermined space range, and sends the data of the ID card owned by the operator to a second detecting portion. After confirming whether or not the data received by the second detecting portion agrees with the pre-registered ID data registered in an ID information registration portion 9, the data is sent to the control portion 5. The control portion does not activate the buzzer 7 even when the control portion receives data about the customer's approach from the first detecting portion 3 if the operator is present near the POS terminal unit.

18 Claims, 5 Drawing Sheets

Fig. 4
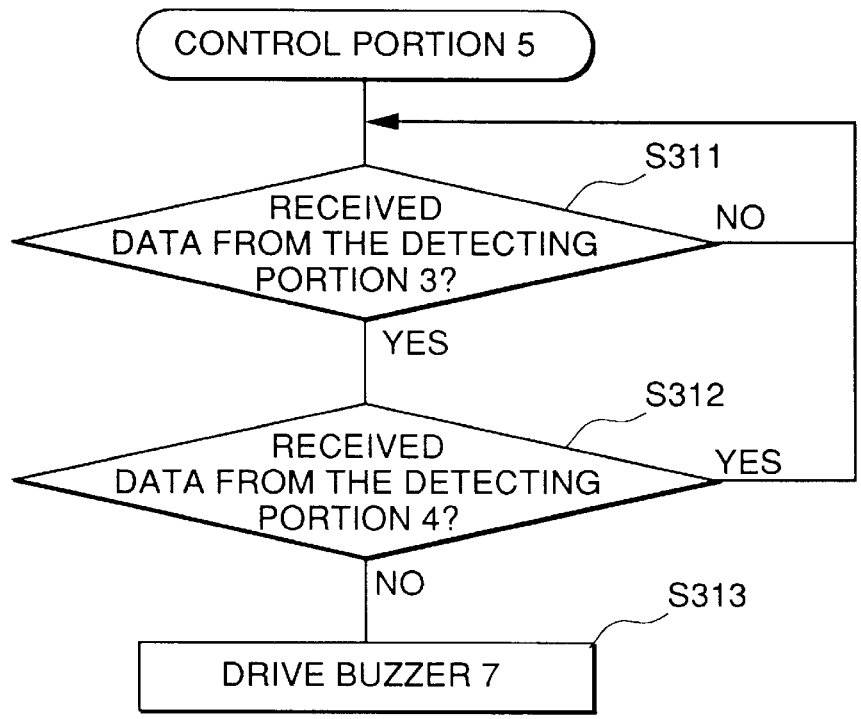
(a) BEFORE DRIVING BUZZER 7
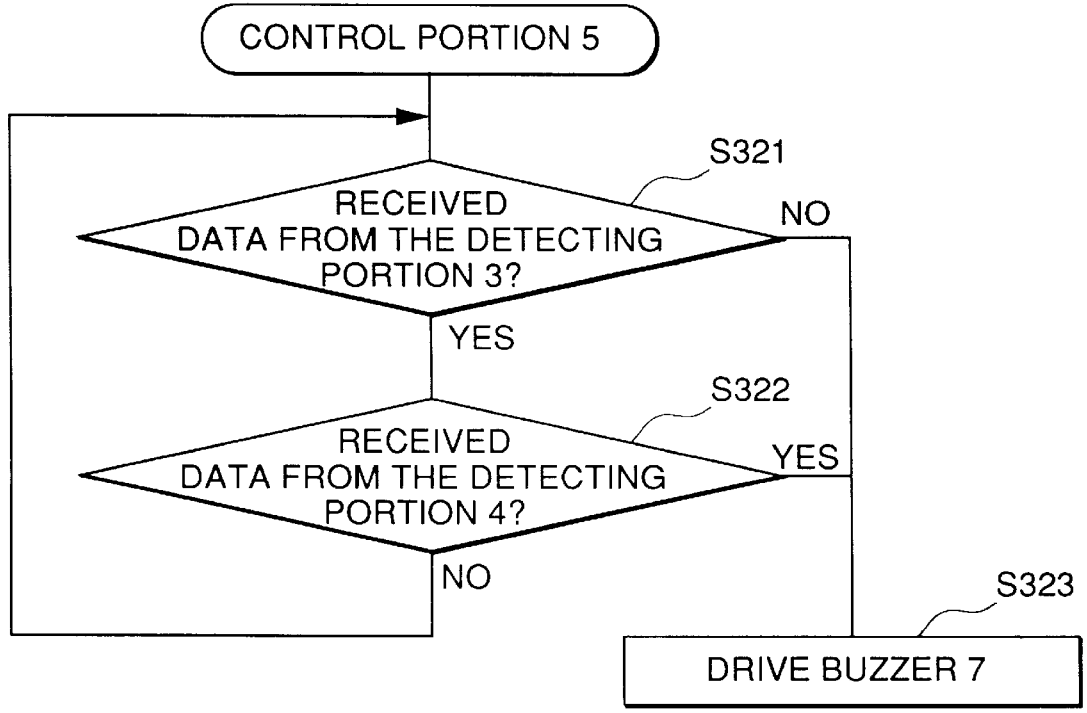
(b) AFTER DRIVING BUZZER 7

Fig. 5 (a) BEFORE DRIVING BUZZER 7
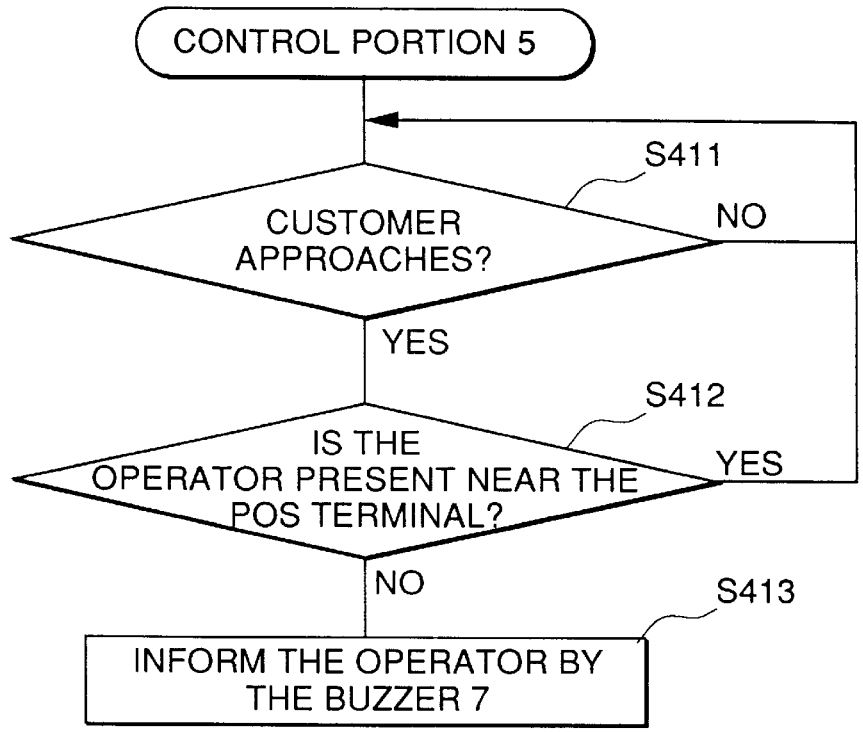
(b) AFTER DRIVING BUZZER 7
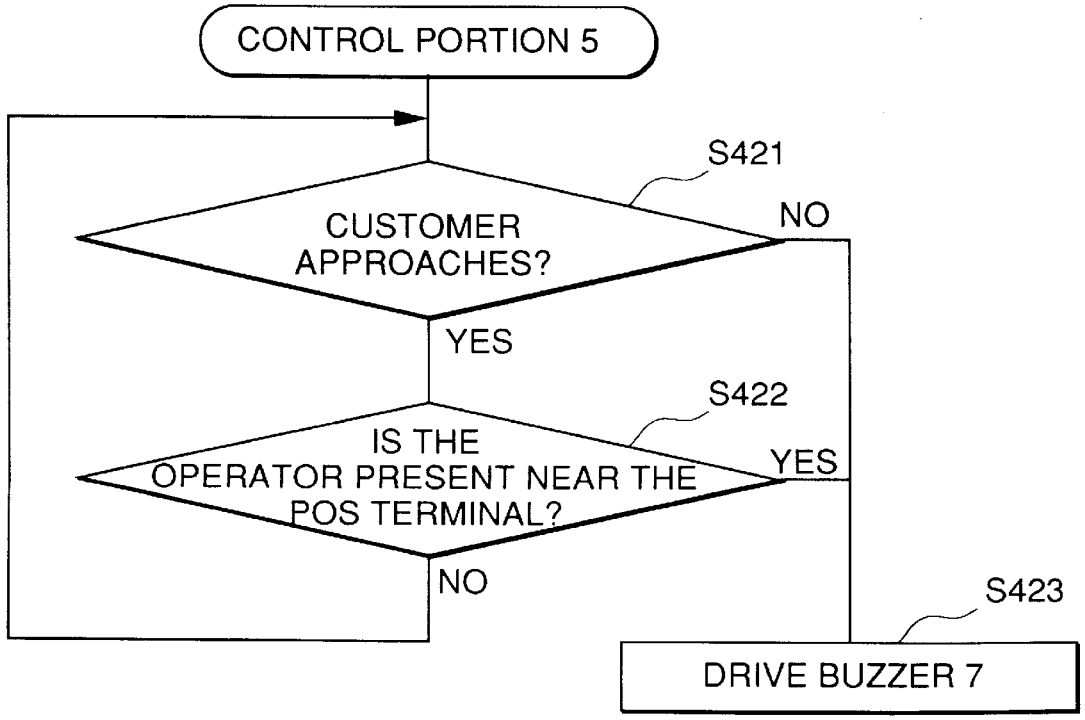

POS TERMINAL UNIT PROVIDED WITH CUSTOMER APPROACH NOTIFICATION FUNCTION

BACKGROUND OF THE INVENTION

1. Field of the Invention

The present invention relates to a POS (Point Of Sales) terminal unit provided with a customer approach notification function which is suitable for use as the POS for notification of the presence of a customer waiting to make a purchase when the operator is absent.

2. Background Art

Recently, POS (Point Of Sales) terminal units have become widely distributed, and the performances of the POS terminals have been remarkably improved, including convenient serviceability.

However, a problem is often encountered in how to notify a salesclerk of the shop that a customer is waiting for making a purchase when a salesclerk is absent. That is, in a small shop like a convenience store, where only a few salesclerk work, the sales clerk often leaves the POS terminal unit, when they are working at a display case or outside the store area (a storage space or the office in the back of the shop). In such a circumstance, when a customer wishes to settle the account, the customer must call the salesclerk by himself.

In the field of a cash transaction by ATM, usually a sensor such as an infrared sensor is provided near the terminal unit for sensing the presence of a human being in order to conduct an automatic transaction or to warn that a card or change has been left behind using voice or image by sensing approach or departure of a customer through the sensor, and in order to prevent crimes by using outside of regular business hours for customer's benefit and for monitoring the transactions.

However, in the POS terminal units provided in convenience stores, there is no way to provide notification of the presence of the customer waiting for making a purchase or to call the salesclerk's attention to the presence of a customer. This entails the customer waiting meaninglessly or calling the salesclerk, so that such a conventional POS unit causes a lowering of the service and allow burglary to occur in the extreme case.

The present invention is carried out to solve the above described problems. It is therefor objects of the present invention to provide a POS terminal units, which, when the operator is absent from the POS terminal unit, it is possible to notify the operator the presence of a customer waiting for the account by an warning sound, and, even when the operator is away from the POS terminal unit, it is also possible to prevent an obstrusive sound when a warning is unnecessary due to previously identifying the presence of the customer.

SUMMARY OF THE INVENTION

A POS terminal unit provided with a customer's approach notification function according to the present invention comprises: a first detecting device for detecting a presence of a customer near the POS terminal unit; a control device for identifying the presence of the customer near the POS terminal unit by detecting continuously the presence of the customer for a period of time; and an output device for notifying an operator the presence of the customer near the POS terminal unit. The POS terminal unit comprises: a first detecting device for detecting the presence of the customer by a wireless devices, and for sending data to a control device when detecting the customer for more than a time period predetermined by the time information setting portion, a second detecting device for detecting the presence of the operator near the POS terminal unit, wherein the control device annuls the notification to the operator by the output device, when the operator is present near the POS terminal unit.

In the above structure of the POS terminal unit, when the approach sensor detects the approach of a customer towards the POS terminal unit, the control device or the control portion operates an output device such as a buzzer by receiving the data from the first detecting portion. The present POS terminal unit can recognize the presence of the customer even when the operator is apart from the POS terminal unit. The first detecting portion is constituted by a non-contact type ID card identification sensor or the like, and is capable of receiving the data of the ID card located within a predetermined space range. The ID card identification sensor reads the data of the ID card possessed by the operator and outputs the data of the ID card to the second detecting device or portion. The second detecting portion sends the data to the control portion after confirming that the received data agrees with the data stored in the ID information registration portion. The control portion does not drive the output device such as a buzzer 7 even when the control portion receives data on a customer's approach from the first detecting portion 3, if the operator is present near the POS terminal unit. Thereby, it is possible to avoid the sound of buzzer in an unnecessary situation such as when the operator is present.

BRIEF DESCRIPTION OF THE DRAWINGS

FIGS. 4A and 4B are a diagram for explaining the operation of the present embodiment by depicting flow charts showing operations of the control portion 5 shown in FIG. 1.

FIGS. 5A and 5B are diagrams for explaining the operation of the present embodiment by depicting flow charts showing operations of the control portion 5 shown in FIG. 1 from the point of view of its functions.

DETAILED DESCRIPTION OF THE INVENTION

Figure 1:
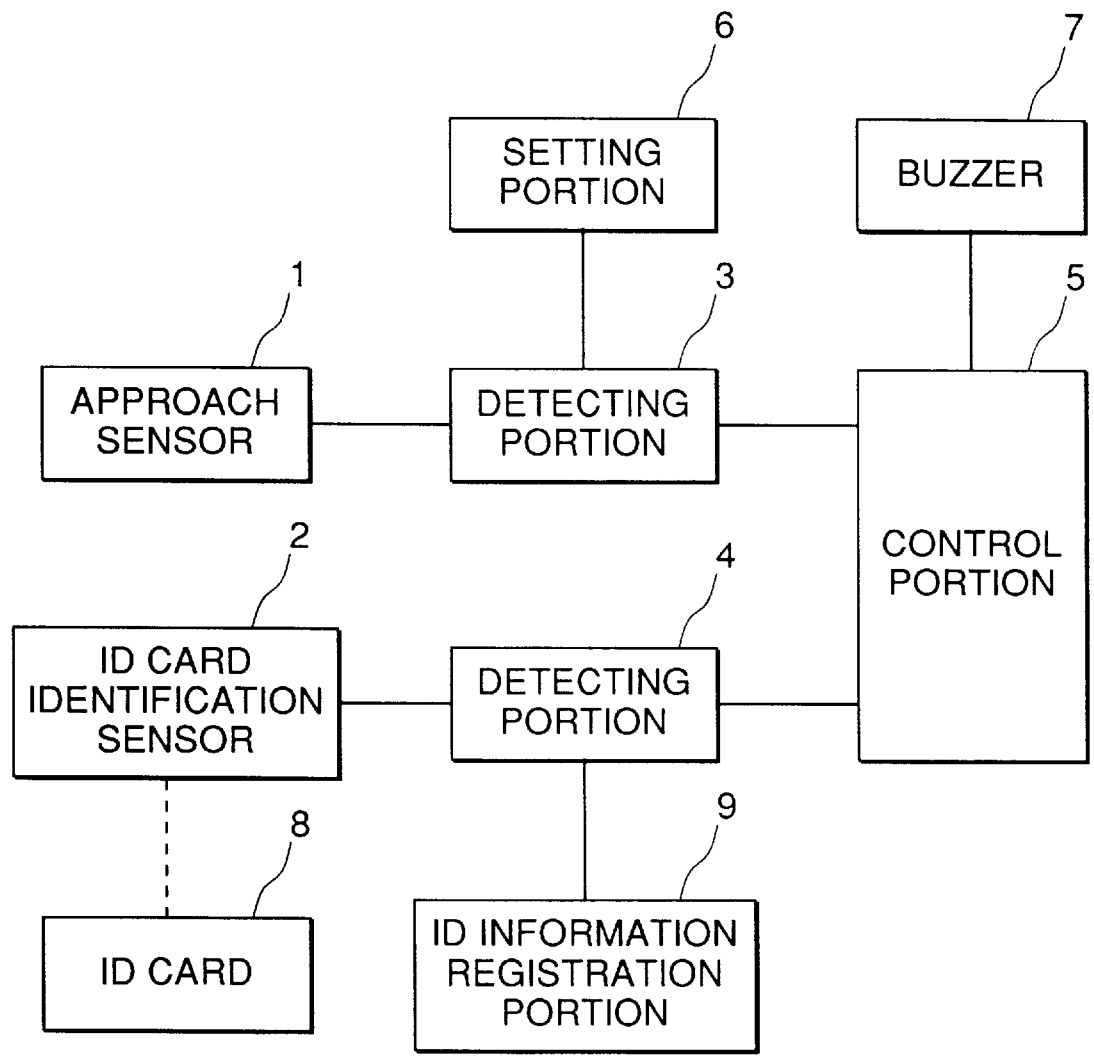
FIG. 1 is a block diagram showing an embodiment of the present invention.

FIG. 1 is a block diagram showing the structure of an embodiment of the present invention. In FIG. 1, the reference numeral 1 denotes an approach sensor. The approach sensor is formed, for example, by an infrared sensor. The infrared sensor senses infrared light emitted by the human body when a customer approaches a range (space) predetermined according to the characteristics of the infrared sensor and provides notification of the result of sensing. The detecting portion 3 receives the sensing result and send the data to the control portion 5 when the sensor continuously senses the presence of the customer for more than a predetermined period. By continuously sensing for more than a predetermined period, the POS terminal can be prevented from sounding the buzzer due to a customer just crossing (not for making a purchase) the infrared sensor. The setting portion 6 is composed of setting files, storing setting information to be used by the detecting portion 3, and the setting portion 6 can change setting information at any desired timing. Here, it is assumed that the setting portion 6 stores information concerning a period of time from detecting the customer's approach for deciding that the customer is going to make a purchase.

The reference numeral 2 denotes an ID card sensor. An ID card 8 and the ID card sensor 2 are, for example, a non-contact type ID card system using an electromagnetic wave. When the ID card is present in a predetermined range of space, the ID card 8 receives an electromagnetic wave emitted by the ID card identification sensor 2, and an ID data is sent to the ID card identification sensor 2 by use of the source voltage extracted from the electromagnetic wave. When the ID card identification sensor 2 receives the data from the ID card 8, it sends the data to the detecting portion 4. The detecting portion 4 judges whether or not the ID data is registered in the ID information registration portion 9, and sends the data to the control portion 5 when the detecting portion 4 has received the registered ID data.

Each operator carries the ID card 8, and the ID card stores the proper data showing that the card holder is an operator of this system. The ID information registration portion 9 is formed by a setting file, which stores the ID data for identifying the registered operators authorized to operate the POS terminals. The detecting portion 4 confirms a person as the proper operator by verification between the ID data and the data in the ID card.

The reference numeral 5 denotes a control portion composed mainly of a microprocessor for controlling the POS terminal unit by a program stored in a memory. The control portion 5 always monitors the data supplied through the detecting portion 4. The POS terminal unit decides that the operator is present near the POS terminal unit when the ID card is present in the data coverage range of the ID card identification sensor 2, and also when the detecting portion 4 is transmitting the data to the control portion 5. In contrast, when the ID card 8 is out of the data coverage range of the ID card identification sensor 2 and also when the detecting portion 4 is not transmitting the data to the control portion 5, the POS terminal unit decides that the operator is located away from the POS terminal unit. Furthermore, the control portion 5 always monitors the data from the detecting portion 3. When receiving the data from the detecting portion 4, it is decided that a customer coming close is approaching the POS terminal unit.

The control portion 5 decides the following four types of decisions from (a) to (d) according to the detecting portion 3 and the data received from the detecting portion 4.

(a) When the POS terminal unit receives data from both the detecting portion 3 and from the detecting portion 4, it is decided that a customer is approaching the POS terminal unit and the operator is present near the POS terminal unit.

(b) When no data is arrived from the detecting portion 3, and the data from the detecting portion 4 arrives, it is decided that no customer is near the POS terminal unit, but the operator is present near the POS terminal unit.

(c) When the data from the detecting portion 3 arrives, but no data arrives from the detecting circuit 4, it is decided that the customer is approaching the POS terminal unit but the operator is away from the POS terminal unit.

(d) When no data arrives from the detecting portion 3 or from the detecting portion 4, it is decided that a customer and the operator are not present near the POS terminal unit.

Among the above four types of decisions, when the control portion 5 decides that the present state is decision (c), the buzzer is activated. If the decision is (a), (b), or (d), the activation of the buzzer is suspended.

The control portion 5 monitors the data from both detecting portions 3 and 4, and when the decision changes from decision (c) to any one of the decisions (a), (b), or (d), sound of the buzzer is terminated.

Figure 2:
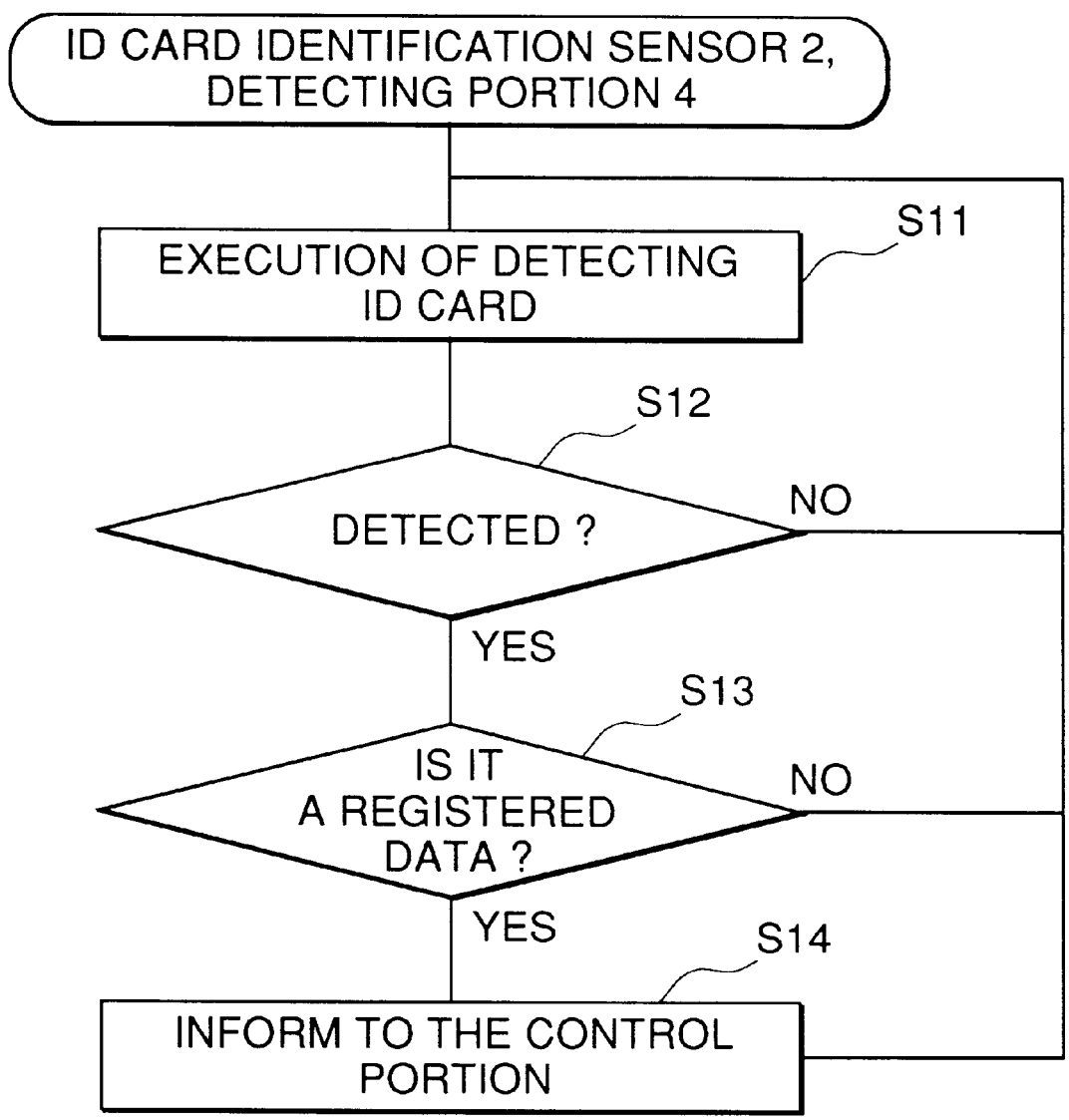
FIG. 2 is a diagram for explaining an operation of the present embodiment by depicting a flowchart showing operations of the ID card identification sensor 2 and the second detecting portion 4 shown in FIG. 1.
Figure 3:
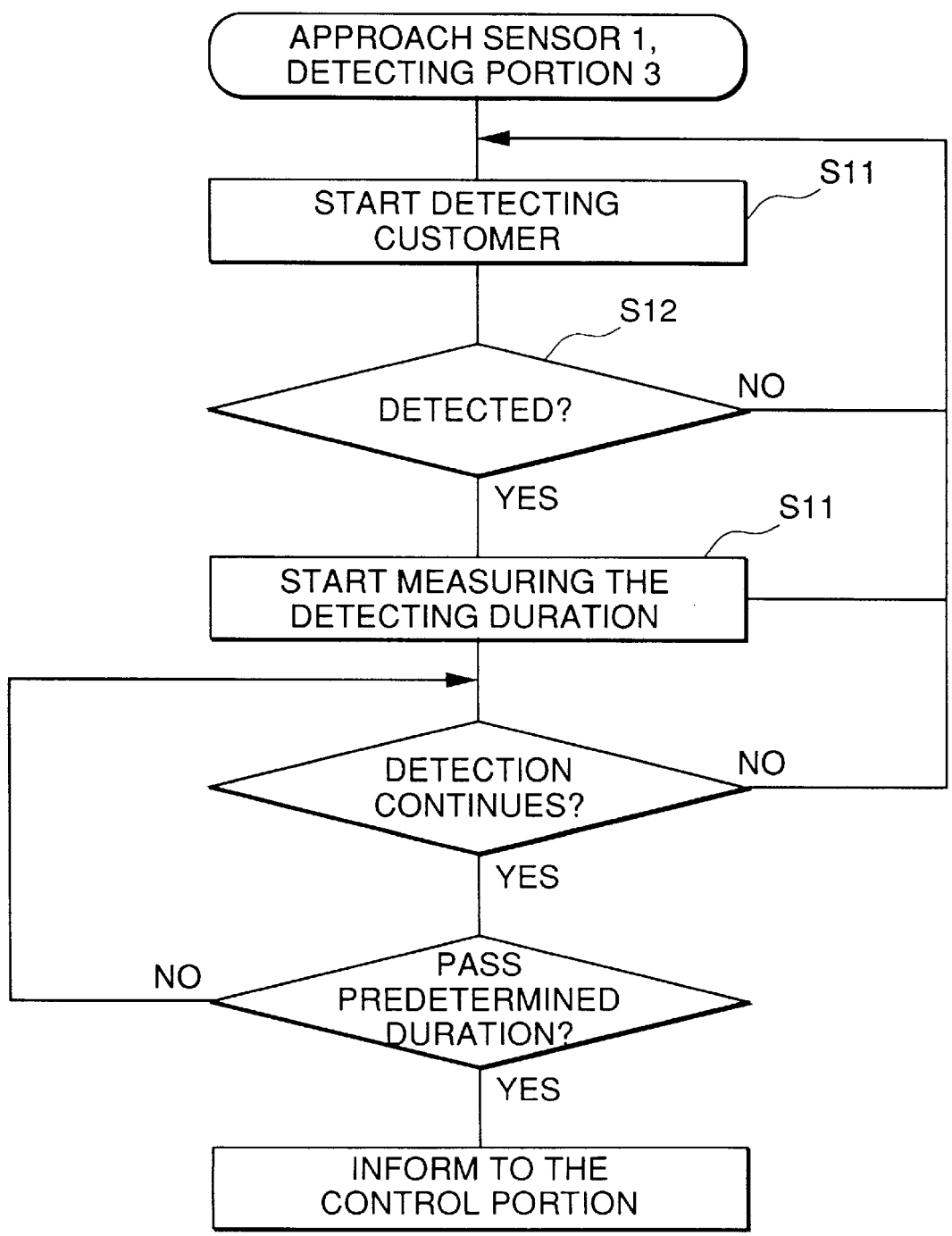
FIG. 3 is a diagram for explaining the operation of the present embodiment by depicting a flow chart showing operations of the approach sensor 1 and the first detector 3 shown in FIG. 1.

FIGS. 2 to 5 are diagrams for explaining the operation of the present embodiment. FIG. 2 shows a flow chart of operations of the ID card identification sensor 2 and the detecting portion 4, FIG. 3 shows a flow chart of operations of the approach sensor 1 and the detecting portion 3, FIG. 4 shows the operation of the control portion 5 before and after the activation of the buzzer, and FIG. 5 shows the operation of the buzzer 7 before and after the activation.

Hereinafter, the operation of the present embodiment shown in FIG. 1 will be described with reference to flow charts shown in FIGS. 2 to 5.

The ID card identification sensor 2 always monitors the presence or absence of an ID card within a predetermined range (step S11 in FIG. 2), and when an ID card 8 is detected (step S12), the ID card data received from the ID card 8 is sent to the detecting portion 4. The detecting portion 4 decides whether or not the ID card data is registered in the ID information registration portion 9 (step S13), and if the ID data is registered, then the ID card data is sent to the control portion 5. If the data is not registered, the data is not be transmitted and the monitoring continues.

The approach sensor 1 always monitors the presence or absence of an object (customer) with a predetermined range (step S21 in FIG. 3), and when the approach of a customer is detected (S22), the data of this presence is sent to the detecting portion 3. When receiving the data of this presence, the detecting portion 3 starts measuring the passing time (step S23), and monitors the data from the approach sensor 1 until the time period determined by the setting portion 6 elapses (step S24).

When the time period has passed during the state of receiving the data of this presence (step S 25), the detecting portion 3 judges that a customer is approaching the POS terminal unit for making a purchase, and sends such data to the control portion 5 (step S26). If the data of this presence is stopped before the time period passes, the detecting portion 3 judges that there is no customer making a purchase, and no data is sent to the control portion 5.

The control portion 5 checks the data from the detecting portion 3 (step 311 in FIG. 4), after receiving the data from the detecting portion 3, subsequently checks the data from the detecting portion 4. When no data is received from the detecting portion 4, the control portion 5 activates the buzzer 7 (step S313). If the data from the detecting portion 4 is received, the buzzer 7 is not activated. After activating the buzzer, the control portion 5 continuously monitors the data from the detecting portion 3 (step S321) and the detecting portion 4 (step S322), and if no data arrives from the detecting portion 3 and the data arrives from the detecting portion 4, then the buzzer is terminated.

Here, the flow-chart shown in FIG. 5 illustrates another representation of each box when view in terms of functions, but the practical operations are the same. When a customer approaches the POS terminal unit (step S411) and when a operator having an ID card is absent from the POS terminal unit (step S412), the control portion 5 activates the buzzer (step S413). If the customer leaves the POS terminal unit (step S421) or when the operator approaches the POS terminal unit (step S422), the control portion 5 causes the buzzer 7 to terminate (step S423).

In the above embodiment, an infrared sensor was given as an example of the approach sensor 1. However, any sensor can be used if it is a sensor using a wireless device as an medium such as a sound wave sensor. Furthermore, the ID card 8 may be any device other than an ID card, if it is a device which is capable of sending individual ID data allowing identification of an operator as the operator of the POS terminal unit. In this case, the ID card identification sensor 2 constitutes a device capable of receiving the above ID data. The buzzer may be a chime or a lamp, if it is an output means providing notification of the approach or the presence of a customer.

As described above, the present invention provides a POS terminal unit which is capable of providing notification of the presence of a customer waiting to make a purchase by a sound of buzzer or the like, when the operator of the POS terminal unit is absent from the POS terminal unit. The present POS terminal unit also capable of avoiding the sound of buzzer, even when the operator is absent from the POS terminal unit, if the POS terminal unit is aware of the presence of the customer in advance, which results in causing the following effects:

(1) It is possible to reduce the meaningless waiting time for a customer while the operator of the POS terminal is not aware of the presence of the customer, because the present POS terminal unit is provided with a function that, when the customer approaches to the POS terminal unit and while the operator is absent, the POS terminal unit provides notification of the presence of the customer to the operator.

(2) It is possible to avoid sounding the buzzer when it is unnecessary because the operator is present near the POS terminal unit by judging in advance whether or not the operator is present near the POS terminal unit.

(3) Since the POS terminal unit judges whether or not it is necessary to sound the buzzer after a predetermined time period passes when the customer approaches, it is possible to avoid the unnecessary sounding of the buzzer, when, for example, the customer just passing in front of the POS terminal unit.

What is claimed is:

1. A POS terminal unit provided with a customer approach notification function, the POS terminal unit comprising:

a first detecting device for detecting the presence of a customer near the POS terminal unit;

a control device for identifying the presence of the customer near the POS terminal unit by continuously detecting to determine after a predetermined period of time whether the customer is near the POS terminal unit and controlling an outputting portion; and an output device for notifying an operator of the POS terminal unit about the presence of the customer under the control of the control device.

2. A POS terminal unit provided with a customer's approach notification function according to claim 1 further comprising: a second detecting device for detecting the presence of an operator near the POS terminal unit, wherein the control device suspends the notification to the operator by the output device, when the operator is present near the POS terminal unit.

3. A POS terminal unit provided with a customer approach notification function according to claim 2, wherein the second detecting device comprises a non-contact type ID card system composed of an ID card and an ID card identification sensor.

4. A POS terminal unit provided with a customer approach notification function according to claim 2, wherein the second detecting device identifies the presence of the designated operator located within a predetermined range, and wherein said control device suspends the notification to the operator by an output device when the presence of the operator is recognized by verifying with the pre-registered data.

5. A POS terminal unit provided with a customer approach notification function comprising:

a sensor portion for detecting by a wireless device the presence of a customer near a POS terminal unit;

a first detecting portion for transmitting the presence of a customer to a control portion when said sensor detects the presence of the customer;

a setting portion for setting time information used by said first detecting portion;

a second detecting portion for detecting by a wireless device the presence of an operator near the POS terminal unit; and a control portion for providing a notification of the presence of a customer when the first detecting portion continuously detects the presence of a customer for a time longer than a predetermined period set by the time setting portion, and for suspending the notification about the presence of a customer waiting to make a purchase when the second detecting means recognizes the presence of the operator near the POS terminal unit.

6. A POS terminal unit provided with a customer approach notification function according to claim 5, wherein the setting portion stores time information which corresponds to the time period from the time when the first detecting circuit detects the approach of a customer to a time that the customer is waiting for making a purchase, and wherein time information can be updated at any timing.

7. A POS terminal unit provided with a customer approach notification function according to claim 5, wherein said second detecting device receives an ID designated to an operator through an ID card system, decides that the operator is the proper operator who is authorized to operate the POS terminal unit, and inform the control portion of the decision.

8. A POS terminal unit provided with a customer approach notification function according to claim 6, wherein said control portion monitors the first and second detecting portions and controls the output portion by recognizing that (1) when receiving data from both said first and second detection portions, the customer is present near the POS terminal unit and the operator is also present near the POS terminal unit, (2) when receiving no data from the first detecting portion and receiving data from the second detecting portion, the customer is absent from the POS terminal unit but the operator is present near the POS terminal unit, (3) when receiving data from the first detecting portion and when receiving no data from the second detecting portion, the customer is present near the POS terminal unit but the operator is absent from the POS terminal unit, and (4) when receiving no data from both first and second detecting portions, the customer is absent near the POS terminal and the operator is also absent near the POS terminal.

9. A POS terminal unit provided with a customer approach notification function according to claim 8, wherein said control portion notifies the operator presence of a customer waiting to make a purchase by controlling the output portion only when the control portion receives data from the first detecting portion and receives no data from the second detecting portion.

10. A unit provided with a customer approach notification function, the unit comprising:

a first detecting device for detecting the presence of a customer near the unit;

a control device for identifying the presence of the customer near the POS terminal unit by continuously detecting to determine whether the customer has been near the POS terminal unit for a predetermined period of time and controlling an outputting portion; and an output device for notifying an operator of the unit about the presence of the customer under the control of the control device.

11. The unit provided with a customer approach notification function according to claim 10 further comprising:

a second detecting device for detecting the presence of an operator near the unit, wherein the control device suspends the notification to the operator by the output device, when the operator is present near the unit.

12. The unit provided with a customer approach notification function according to claim 11, wherein the second detecting device comprises a non-contact type ID card system composed of an ID card and an ID card identification sensor.

13. The unit provided with a customer approach notification function according to claim 12, wherein the second detecting device identifies the presence of the operator within a predetermined range, and wherein said control device suspends the notification to the operator by an output device when the presence of the operator is recognized by second detecting device.

14. A unit provided with a customer approach notification function comprising:

a sensor portion for detecting by a wireless device the presence of a customer near a unit;

a first detecting portion for transmitting the presence of a customer to a control portion when said sensor detects the presence of the customer;

a setting portion for setting time information used by said first detecting portion;

a second detecting portion for detecting by a wireless device the presence of an operator near the unit; and a control portion for providing a notification of the presence of a customer when the first detecting portion continuously detects the presence of a customer for a time longer than a predetermined period set by the time setting portion, and for suspending the notification about the presence of a customer waiting to make a purchase when the second detecting means recognizes the presence of the operator near the unit.

15. The unit provided with a customer approach notification function according to claim 14, wherein the setting portion stores time information which corresponds to the time period from the time when the first detecting circuit detects the approach of a customer to a time that the customer is waiting for making a purchase, and wherein time information can be updated at any timing.

16. The unit provided with a customer approach notification function according to claim 14, wherein said second detecting device receives an ID designated to an operator through an ID card system, decides that the operator is the proper operator who is authorized to operate the unit, and informs the control portion of the decision.

17. The unit provided with a customer approach notification function according to claim 15, wherein said control portion monitors the first and second detecting portions and controls the output portion by recognizing that (1) when receiving data from both of said first and second detecting portions, the customer is present near the unit and the operator is also present near the unit, (2) when receiving no data from the first detecting portion and receiving data from the second detecting portion, the customer is absent from the unit but the operator is present near the unit, (3) when receiving data from the first detecting portion and when receiving no data from the second detecting portion, the customer is present near the unit but the operator is absent from the unit, and (4) when receiving no data from both the first and second detecting portions, the customer is absent near the unit and the operator is also absent near the unit.

18. The unit provided with a customer approach notification function according to claim 17, wherein said control portion notifies the operator of the presence of the customer waiting to make a purchase by controlling the output portion only when the control portion receives data from said first detecting portion and receives no data from the second detecting portion.

* * * * *